United States Patent [19]

Falci et al.

[11] 4,221,819
[45] Sep. 9, 1980

[54] WATER AND COLOR RETENTION TREATMENT FOR FROZEN PROCESSED SHRIMP

[75] Inventors: Kenneth J. Falci, Fairfield; Robert N. Scott, Wallingford, both of Conn.

[73] Assignee: Olin Corporation, New Haven, Conn.

[21] Appl. No.: 33,611

[22] Filed: Apr. 26, 1979

Related U.S. Application Data

[63] Continuation of Ser. No. 820,981, Aug. 1, 1977, abandoned.

[51] Int. Cl.$^3$ ............................................. A22C 29/02
[52] U.S. Cl. .................................. 426/262; 426/267; 426/268; 426/643
[58] Field of Search ............... 426/310, 332, 322, 335, 426/532, 643, 262, 267, 268

[56] References Cited

U.S. PATENT DOCUMENTS

| | | | |
|---|---|---|---|
| 2,064,872 | 12/1936 | Ash et al. | 426/643 X |
| 2,758,930 | 8/1956 | Toulmin | 426/643 X |
| 3,036,923 | 5/1962 | Mahon | 426/643 X |
| 3,982,030 | 9/1976 | Alsina | 426/643 X |

OTHER PUBLICATIONS

Gordon, A., Journal of Food Manufacturing, Jul. 1971, pp. 57, 58.
Mathgn, C., Fishery Technology, 5, 1968, pp. 104–112.
Ellinger, R. H., "Phosphates as Food Ingredients", CRC Press, pp. 131–145, 1972.
Gibson, D. M. et al., Journal of Food Technology, 8, 1973, pp. 197–204.

Primary Examiner—Robert A. Yoncoskie
Attorney, Agent, or Firm—William A. Simons; Thomas P. O'Day

[57] ABSTRACT

In a process for treating shrimp that comprises (a) soaking whole, peeled and deveined shrimp in an aqueous solution containing at least one phosphate salt; and (b) thereafter freezing said soaked shrimp to preserve the shrimp for later cooking and consumption; wherein the improvement comprises carrying out sait soaking step for sufficient time and in the presence of an effective amount of a trace metal salt selected from the group consisting of calcium salts, magnesium salts, and mixtures thereof, in order to substantially maintain the trace metal content in said shrimp, whereby said treated shrimp will have white tissue coloration and a natural tender texture after cooking.

11 Claims, No Drawings

WATER AND COLOR RETENTION TREATMENT FOR FROZEN PROCESSED SHRIMP

This is a continuation of application Ser. No. 820,981, filed Aug. 1, 1977, now abandoned.

Frozen seafood exhibits a significantly extended shelf life over refrigerated or iced seafood. However, a common fallacy is the assumption that freezing seafood obviates all quality deterioration. Thawed seafood cooked and prepared for consumption often exhibits such palatably undesirable characteristics as dryness, toughness, and a translucent raw appearance.

Fresh seafood generally contains some 80 percent water. Although the major portion of this retained water is chemically bound to muscle and tissue and accordingly is not easily released, about 10 to 15 percent of the water normally is lost during processing and handling from the time of actual catch to thawing of the frozen seafood for cooking. This water loss results in adverse changes in texture, juiciness and appearance.

In order to minimize fluid loss, seafood packers have found that soaking the seafood in an NaCl solution containing a phosphate compound is effective. Various studies have been reported in the literature directed to phosphate seafood treatment (e.g., A. Gordon, *Journal of Food Manufacture*, July, 1971 (pp. 57-58); D. M. Gibson and C. K. Murray, *Journal of Food Technology*, (1973), 8, (pp. 197-204). However, while this method of treatment does serve to reduce loss of water, disadvantages are still encountered in that the thawed seafood often is left with an unappetizing translucent or raw appearance and a somewhat rubbery texture, even after cooking.

It has now been discovered that including calcium and/or magnesium in the phosphate treatment solution allows for adequate water uptake by soaked seafood to compensate for moisture loss during processing, and further results in a desirable opaque, white, cooked seafood product with improved texture. Advantageous treatment of shrimp particularly has been achieved.

Any of the various phosphates known to be useful in the treatment of processed fish can be used in the present treatment composition. Typical commercial phosphates which have been found useful in seafood soak solutions are polyphosphates, such as sodium tripolyphosphate (STPP), tetra sodium pyrophosphate (TSPP) and sodium hexametaphosphate (SHMP); sodium orthophosphates such as sodium dihydrogen phosphate (MSP); disodium phosphate (DSP), and trisodium phosphate (TSP); and mixtures thereof. A discussion of the effectiveness of these various phosphates in water-loss prevention treatment of frozen prawns is provided in an article by C. Mathen in *Fishery Technology*, 5, (1968), 2, (pp. 104-112).

While phosphate or phosphate-NaCl soak solutions have been shown to be adequate in arresting water-loss in processed seafoods, the thawed product even after cooking, evidences quality deterioration in the form of an undesirable color loss and a tough rubbery texture. According to the present invention, the effectiveness of the phosphate treatment compositions is enhanced by the inclusion of calcium and/or magnesium in the phosphate soak solutions by utilizing a calcium or magnesium phosphate salt, or, preferably, by including a supplemental calcium or magnesium salt in the phosphate composition. The problem of texture and color-loss has now been discovered to be related to trace metal depletion in the shrimp tissue during the phosphate treatment. Calcium and/or magnesium salts in the soak solution serve as a source to replenish these metals and to help maintain the original tissue chemical make-up and condition, resulting in white tissue coloration and a natural tender texture. While any food grade calcium or magnesium salts may be used in the treatment composition of the invention, such as those salts listed in *Food Chemicals Codex*, 2nd Edition, National Academy of Sciences, preferred salts are sulfates, iodates, gluconates, citrates, chlorides, carbonates, bromates, ascorbates, and acetates. Chlorides and sulfates are particularly preferred. Calcium salts, and in specific calcium chloride, are most preferred.

The calcium and/or magnesium salts can be added to the phosphate soak solution in any effective amount which serves to augment the calcium or magnesium content of the soaked seafood product. The most effective concentration of these salts generally is dictated by the amount of phosphate and the particular type of salt and phosphate utilized in the treatment solution. Phosphate ions are reactive with ions such as $Ca^{+2}$ and $Mg^{+2}$ and tend to produce soluble metal-chelate compounds. Such chelation-extraction probably is the original cause of the magnesium and calcium depletion from shrimp tissue treated with the prior art phosphate solutions. So as not to adversely affect the phosphate concentration in the solution and yet maximize the calcium and/or magnesium content, the calcium and/or magnesium salt generally should be added in as concentrated an amount so as to result in a solution, without initiating polyphosphate-chelate precipitation. Calcium chelate compounds are more soluble in aqueous solution than magnesium chelate compounds; therefore, calcium salts can be used in a higher concentration and thus more conveniently and effectively than magnesium salts and accordingly are preferred.

The treatment solution components can be used in any effective concentration. The most effective concentration make-up of the seafood treatment solution varies with the particular phosphate used and the type of seafood being processed. Polyphosphate solutions are preferred, and, in particular, sodium tripolyphosphate (STPP) solutions are most preferred. In general, about 1 to about 40 percent by weight aqueous phosphate solutions normally are used. STPP solutions in a concentration range of about 3 to about 30 percent are preferred; about 4 to about 7 percent solutions are particularly preferred. Maximized water take-up and retention during treatment has been accomplished by utilizing a NaCl solution of the phosphate. Any effective sodium chloride concentration can be used. However, it has been found preferable to use a solution including about 0.1 to about 30 percent by weight weight sodium chloride. About 1 to about 10 percent solutions, in particular about 1.4 to about 1.6 percent by weight NaCl solutions, are most preferred. As discussed above, any effective concentration of Ca or Mg salts may be used. In general, supplemental Ca and/or Mg salts in about 0.1 to about 50 percent solutions are preferred; about 0.2 to about 10 percent solutions are particularly preferred. The preferred polyphosphate, sodium tripolyphosphate, has been discovered to be the most compatible polyphosphate salt when used in conjunction with the additive calcium and/or magnesium salts of the invented composition. A solution containing about a 1.5-2.5/1 molar ratio of STPP or $CaCl_2$ is preferred; about a 2/1 ratio is particularly preferred. Expressed in other relative terms, about 0.5 to about 1.0 percent by weight CaCl₂ is most preferred when used in conjunction with the preferred 4 to about 7 percent by weight STPP-NaCl solutions.

The aqueous soak solutions used to treat the seafood are prepared by dissolving the select salt compositions in water to form solutions of the desired concentrations. The dry salt compositions of the present invention may be formulated in any proportions so as to produce effective concentration proportions when prepared as an aqueous solution, as defined above. The preferred dry salt compositions generally comprise about 40 to about 95 percent by weight phosphate, about 5 to about 45 percent by weight NaCl, and about 2 to about 25 percent by weight calcium or magnesium salt. Most preferably, the compositions comprise about 65 to about 93 percent polyphosphate, about 12 to about 25 percent NaCl, and about 5 to about 11 percent calcium chloride.

The actual seafood processing commonly is performed by first preparing the seafood by cleaning the catch (peeling and deveining in the case of shrimp) and then soaking the seafood in phosphate solution. After soaking for an appropriate time to provide a desired amount of water uptake in the treated flesh, the seafood is then removed from the soak solution, drained, and frozen, or cooked and frozen, to store and preserve it for later thawing, cooking and consumption. This soak treatment may also be useful as a treatment step included in other seafood processing techniques, such as icing or canning or freeze-drying.

The treatment process of the present invention using a phospate treatment solution, supplemented with Ca and/or Mg salts, may be utilized as a unitary soaking, or alternatively as a two-step soaking. As a two-step procedure, the seafood first is soaked in a Ca and/or Mg salt aqueous solution and then in a standard phosphate solution, or vice versa. A single soaking is preferred, for reasons of cost and convenience.

The invention is further illustrated by the following examples, although it is understood that the invention is not limited to the specific details of these examples. For example, while the examples provided are directed to a composition and process which are shown to be effective in the treatment of shrimp, the invention may also be utilized in treatment of other types of seafood. All parts and percentages are by weight unless otherwise specified.

COMPARATIVE EXAMPLE A

Effects of Standard Polyphosphate Soak Treatment

A standard polyphosphate brine soak solution was prepared by dissolving 12.5 g (4.85%) sodium tripolyphosphate (STPP), and 3.75 g (1.46%) sodium chloride in 241.30 g water at 0° C. in a 400 ml beaker. Peeled and deveined shrimp, 75.53 g, were then added to the solution and allowed to soak at 0° C. for about 20 hours. After this soak period, the shrimp was dried with a paper towel and weighed, indicating a weight gain of 11.58 g (15.30%). The shrimp were then cooked for 3 minutes in 250 ml of water, containing 2 g sodium chloride, at 85° C. The cooked weight of the shrimp was determined to be 58.11 g (23.1% weight loss, based on original weight). The cooked shrimp samples exhibited a translucent, raw-looking appearance and were somewhat rubbery in texture.

A portion of the cooked shrimp samples was then oven dried at 110° C. for two days to eliminate all moisture content. The dried samples were then analyzed by conventional atomic absorption techniques to determine the trace metal content of the shrimp tissue. A sample of the untreated shrimp (peeled and deveined without any soak treatment) was also dried and analyzed for trace metals in the same manner. This comparative analysis illustrating the metal depleting effect of the polyphosphate soak treatment is reported in Table I below.

TABLE I
EFFECT OF CONVENTIONAL TRIPOLYPHOSPHATE SOAK ON METAL CONTENT OF SHRIMP

| Metal | CONTENT IN PPM[1] | |
|---|---|---|
| | Before Soaking | After Soaking |
| Arsenic | 1.0 | 0.6 |
| Mercury | <0.3 | <0.3 |
| Cadmium | 31 | 38 |
| Lead | <3 | 5 |
| Zinc | 92 | 88 |
| Manganese | 1.6 | 1.2 |
| Iron | 25 | 18 |
| Copper | 7 | 6 |
| Calcium | 4800 | 725 |
| Magnesium | 1600 | 635 |
| Phosphorus | 6800 | 30000 |

[1]weight basis on oven-dried shrimp flesh.

EXAMPLE I A soak solution according to the present invention was prepared by charging 12.5 g (4.73%) STPP, 3.75 (1.42%) NaCl, and 2.0 g (0.75%) calcium chloride (CaCl₂) to 245.8 g water at 0° C. in a 400 ml beaker. The resulting mixture was a somewhat cloudy solution which improved in clarity after about four hours. The peeled and deveined shrimp (63.04 g) were then added to the solution and allowed to soak at 0° C. for about 20 hours. The soaked shrimp were dried with a paper towel and weighed, showing a weight gain of 10.10 g (16%). After cooking the shrimp for three minutes at 85° C. in 250 ml of water containing 2 g of NaCl, the shrimp weighed 54.64 g (13.3% weight loss based on original weight). The cooked shrimp samples exhibited a desirable opaque, white appearance and were of a natural tender texture.

A portion of the cooked shrimp samples was then oven dried at 110° C. for two days and thereafter analyzed for trace metals by atomic absorption.

In order to offer a comparative picture of treatment effects, a sample of peeled and deveined but untreated shrimp, and a sample of shrimp treated with a standard soak solution in the same general manner as described in Comparative Example A were also oven dried and subjected to trace metal analysis.

These comparative results are reported in Table II below. The trace metal analysis demomstrates a clear distinction between the samples treated by the standard solution and the solution of the present invention. These differences may serve to explain the achieved improvement of the present invention in preserving the natural color and texture of the cooked shrimp.

TABLE II
EFFECT OF ADDED Ca SALTS ON Ca and Mg LEVELS IN SHRIMP

| Soaking Time | Composition of Soaking Solution (%) | | | | Observed Metal Content (ppm) | | |
|---|---|---|---|---|---|---|---|
| | STPP | NaCl | CaCl₂ | H₂O | Ca | Mg | P |
| Untreated | — | — | — | — | 5,150 | 1,900 | 6,800 |

TABLE II-continued
EFFECT OF ADDED Ca SALTS ON
Ca and Mg LEVELS IN SHRIMP

| Soaking Time | Composition of Soaking Solution (%) | | | | Observed Metal Content (ppm) | | |
|---|---|---|---|---|---|---|---|
| | STPP | NaCl | CaCl$_2$ | H$_2$O | Ca | Mg | P |
| 20 Hours | 4.85 | 1.46 | — | 93.69 | 595 | 495 | 30,000 |
| 20 Hours | 4.73 | 1.42 | 0.75 | 93.10 | 17,350 | 1,100 | 32,000 |

EXAMPLES II–XIII

These examples were carried out in the same general manner as set forth above in Example I, using, however, varied soak treatment solution compositions. The soak solutions contained STPP, NaCl, and calcium and/or magnesium salts. The solution compositions, in weight percent, and the test results are reported in Table III below.

TABLE III
ADDITIONAL EXAMPLES

| Example No. | Wt. % STPP | Wt. % NaCl | Salts in Soak Sln. | | | Soaking Time | Initial Shrimp Weight (g) | W. Gain (g) | % Wt. Gain | Wt. After Cooking | % Loss[2] After Cooking | Appearance |
|---|---|---|---|---|---|---|---|---|---|---|---|---|
| | | | MgSO$_4$ | MgCl$_2$ | CaCl$_2$ | | | | | | | |
| 2 | 9.31 | — | 1.68 | — | — | 1 hr.[1] | 69.96 | 6.58 | 9.4 | 56.56 | 19.2 | White |
| 3 | 14.51 | — | 1.45 | — | — | 3.5 hr.[1] | 93.25 | 9.58 | 10.3 | 71.10 | 23.8 | White |
| 4 | 4.89 | — | — | 0.37 | — | 17 hr. | 64.87 | 15.66 | 24.1 | 44.45 | 31.5 | Translucent |
| 5 | 9.40 | 1.41 | — | — | 0.75 | 17 hr. | 75.51 | 12.56 | 16.6 | 61.10 | 19.0 | White |
| 6 | 12.90 | — | 0.55 | — | — | 17 hr. | 66.84 | 6.22 | 9.3 | 52.60 | 21.3 | White |
| 7 | 3.89 | 1.46 | — | — | 0.58 | 20 hr. | 80.23 | 11.87 | 14.8 | 66.03 | 17.7 | White |
| 8 | 4.85 | 1.46 | — | — | — | 72 hr. | 69.51 | 17.22 | 24.8 | 58.14 | 16.4 | Translucent |
| 9 | 4.83 | 1.45 | — | — | 0.58 | 72 hr. | 69.30 | 16.52 | 23.8 | 56.77 | 18.1 | White |
| 10 | 7.13 | 1.9 | — | — | 0.76 | 72 hr. | 80.87 | 15.99 | 19.8 | 59.60 | 26.3 | White |
| 11 | 9.28 | 2.78 | — | — | 0.74 | 72 hr. | 69.50 | 15.43 | 22.20 | 55.33 | 20.4 | Translucent |
| 12[4] | — | — | — | — | — | — | 65.62 | — | — | 48.35 | 26.3 | White-Shriveled |
| 13[3,4] | — | — | — | — | — | — | 84.71 | — | — | 54.49 | 35.7 | White-Shriveled |

[1]Extensive precipitation of chelate compound observed.
[2]% loss based on weight of shrimp prior to soaking. Cooking was carried out in a solution of 2 g of sodium chloride in 250 ml of water for three minutes at 85° C.
[3]Cooked for three minutes at 95° C. in 250 ml water.
[4]Untreated shrimp.

EXAMPLE XIV

A 400 ml beaker was charged with 25.0 g (8.67%) magnesium sulfate (MgSo$_4$) and 263.30 g water. To the resulting solution was added 68.67 g of peeled and deveined shrimp, which were allowed to soak in the solution for three days at 0° C. The shrimp samples were then dried with a paper towel and weighed to indicate a weight gain of 15.38 g (22.4%). The shrimp were then soaked for a second time in an aqueous solution containing 12.5 g (4.98%) STPP and 3.75 g (1.50%) NaCl. After soaking for 20 hours at 0° C., an additional weight gain of 15.19 g (18.1%) was noted. The shrimp were then cooked for three minutes at 85° C. in 250 ml of water containing 2 g of NaCl. The cooked shrimp weighed 42.92 g (37.5% weight loss based on initial weight) and had a desirable opaque white appearance and natural texture. The analysis results of this sample are shown in Table IV below.

EXAMPLE XV

Two-stage Soaking Procedure

A 400 ml beaker was charged with 50.00 g (17.50%) of magnesium sulfate (MgSO$_4$) and 235.8 g of water. To the resulting solution was added 68.19 g of peeled and deveined shrimp and the mixture was allowed to stand at 0° C. for three days at which time the shrimp were dried with a paper towel and weighed. A weight gain of 9.74 g (14.3%) was observed. The shrimp were then soaked for 20 hours in an aqueous solution containing 12.5 g (4.98%) of STPP and 3.75 g (1.50%) of NaCl and an additional weight gain of 9.81 g (12.6%) was observed. The shrimp were cooked as described in Example XIV. After cooking the shrimp weighed 35.05 g (48.6% loss based on original weight) and had a desirable opaque white appearance and tender texture. Analysis results are shown in Table IV below.

TABLE IV
EFFECTS OF ADDED Mg SALTS ON
Ca and Mg LEVELS IN SHRIMP
(Two-Stage Soak)

| EXAMPLES | Composition of Soaking Sln. (%) | | | | Metal Content (ppm) | |
|---|---|---|---|---|---|---|
| | STPP | NaCl | MgSO$_4$ | H$_2$O | Ca | Mg |
| 14 (Stage 1) | — | — | 9.50 | 89.5 | 404 | 36,500 |
| (Stage 2) | 4.98 | 1.50 | — | 93.52 | 228 | 14,000 |
| 15 (Stage 1) | — | — | 17.5 | 82.50 | 440 | 44,000 |
| (Stage 2) | 4.98 | 1.50 | — | 93.52 | 111 | 24,500 |
| Untreated | — | — | — | — | 5,150 | 1,900 |

We claim:
1. In a process for treating shrimp that comprises
   (a) soaking whole, peeled and deveinned shrimp in an aqueous solution containing at least one phosphate salt; and
   (b) thereafter freezing said soaked shrimp to preserve said shrimp to later cooking and consumption;
wherein the improvement comprises:
   carrying out said soaking step for sufficient time and in the presence of an effective amount of a trace metal salt selected from the group consisting of calcium salts, magnesium salts, and mixtures thereof, in order to substantially maintain the trace metal content in said shrimp, whereby said treated shrimp will have white tissue coloration and a natural tender texture after cooking.

2. The process of claim 1 wherein said calcium and magnesium salts are selected from the group consisting of calcium and magnesium sulfates, chlorides, iodates, gluconates, citrates, carbonates, bromates, ascorbates and acetates.

3. The process of claim 1 wherein said phosphate salt is selected from the group consisting of sodium tripolyphosphate, tetra sodium pyrophosphate, sodium dihydrogen phosphate, disodium phosphate, trisodium phosphate, sodium hexametaphosphate, and mixtures thereof.

4. The process of claim 1 wherein said trace metal salt is a calcium salt.

5. The process of claim 4 wherein said calcium salt is calcium chloride.

6. The process of claim 1 wherein said phosphate salt is a polyphosphate selected from the group consisting of sodium tripolyphosphate, tetra sodium pyrophosphate, and sodium hexametaphosphate.

7. The process of claim 6 wherein said polyphosphate is sodium tripolyphosphate.

8. The process of claim 1 wherein said soaking step is carried out in an aqueous solution containing from about 1 to about 40 percent by weight of a phosphate salt, from about 0.1 to about 50 percent by weight of said trace metal salt and from about 0.1 to about 30 percent by weight sodium chloride.

9. The process of claim 8 wherein said soaking step is carried out in an aqueous solution containing about 3 to about 30 percent by weight polyphosphate, about 0.2 to about 10 percent by weight calcium salt, and about 1 to about 10 percent sodium chloride.

10. The process of claim 9 wherein said soaking step is carried out in an aqueous solution containing about 4 to about 7 percent by weight sodium tripolyphosphate, about 0.5 to about 1.0 percent by weight calcium chloride and about 1.4 to about 1.6 percent by weight sodium chloride.

11. The process of claim 10 wherein the molar ratio of sodium tripolyphosphate to calcium chloride is about 2:1.

* * * * *